(12) United States Patent
Streete et al.

(10) Patent No.: US 9,933,916 B1
(45) Date of Patent: Apr. 3, 2018

(54) METHODS, SYSTEMS, AND COMPUTER READABLE MEDIUMS FOR PROVIDING USER INTERFACE INFORMATION ASSOCIATED WITH A COMPUTING SYSTEM

(71) Applicant: VCE Company, LLC, Richardson, TX (US)

(72) Inventors: Jonathan P. Streete, San Jose, CA (US); Rajesh Nandyalam, Whitinsville, MA (US)

(73) Assignee: VCE IP HOLDING COMPANY LLC, Richardson, TX (US)

( * ) Notice: Subject to any disclaimer, the term of this patent is extended or adjusted under 35 U.S.C. 154(b) by 514 days.

(21) Appl. No.: 14/219,717

(22) Filed: Mar. 19, 2014

(51) Int. Cl.
*G06F 3/0482* (2013.01)

(52) U.S. Cl.
CPC .................... *G06F 3/0482* (2013.01)

(58) Field of Classification Search
CPC .................................................... G06F 3/0482
See application file for complete search history.

(56) References Cited

U.S. PATENT DOCUMENTS

| | | | | |
|---|---|---|---|---|
| 5,317,730 A | * | 5/1994 | Moore | G06F 17/243 |
| 5,692,129 A | * | 11/1997 | Sonderegger | G06F 9/445 |
| 2008/0168067 A1 | * | 7/2008 | Ruiz-Velasco | H04L 12/4625 |
| 2009/0150820 A1 | * | 6/2009 | Hayman | G06F 3/0481 715/772 |
| 2009/0288084 A1 | * | 11/2009 | Astete | G06F 9/45533 718/1 |
| 2010/0329642 A1 | * | 12/2010 | Kam | G06F 3/04817 386/280 |
| 2011/0251992 A1 | * | 10/2011 | Bethlehem | H04L 12/2863 707/610 |
| 2012/0054601 A1 | * | 3/2012 | Cohen | G06F 9/4443 715/243 |
| 2012/0180049 A1 | * | 7/2012 | Tsai | G06F 9/45558 718/1 |
| 2012/0215728 A1 | * | 8/2012 | Isaiadis | G06N 3/08 706/25 |
| 2013/0055117 A1 | * | 2/2013 | Sahibzada | G06F 8/38 715/762 |
| 2013/0318481 A1 | * | 11/2013 | Madala | G06F 9/4448 715/854 |
| 2015/0052496 A1 | * | 2/2015 | Helms | G06F 8/34 717/109 |

* cited by examiner

*Primary Examiner* — Andrea N Long
(74) *Attorney, Agent, or Firm* — Jenkins, Wilson, Taylor & Hunt, P.A.

(57) ABSTRACT

Methods, systems, and computer readable mediums for providing user interface (UI) information associated with a computing system are disclosed. According to one exemplary embodiment, a method for providing UI information comprises receiving, from a requesting entity, a request for information associated with an element of a computing system, selecting, using data from the request, a UI element for representing the element from a repository comprising a set of UI elements for representing various elements of the computing system, and providing, to the requesting entity, UI information for displaying the UI element.

17 Claims, 5 Drawing Sheets

```
<CISs>                                                              XML PAYLOAD 200
    <CIS>
        ┌<alias>CIS A-320</alias>
        │<dbid>2067</dbid>
        │<description>CIS A-320 (CIS 320w7500)</description>
        │...
   202 ┤<moid>SJ261-CISA300-999-318-642</moid>
        │<name></name>
        │<url>https://ft168.rj261.rjc188.company.com:8443/fm/CISs/2067</url>
        │<assetid></assetid>
        │<calculatedStatus>critical</calculatedStatus>
        └<firmwareRev></firmwareRev>
        ┌<image>https://url_to_image</image>
   204 ┤<imagewithdecoration>https://url_to_decorated_image</imagewithdecoration>
        └<imagewithbackground>https://url_to_image_with_background</imagewithbackground>
        ...
    </CIS>
</CISs>
```

FIG. 2

METHODS, SYSTEMS, AND COMPUTER READABLE MEDIUMS FOR PROVIDING USER INTERFACE INFORMATION ASSOCIATED WITH A COMPUTING SYSTEM

TECHNICAL FIELD

The subject matter described herein relates to user interfaces. More specifically, the subject matter relates to methods, systems, and computer readable mediums for providing user interface information associated with a computing system.

BACKGROUND

Management software may include user interfaces (UIs) or graphical user interfaces (GUIs) for managing, monitoring, viewing, and/or configuring one or more elements (e.g., physical resources, virtual resources, and/or components) within or associated with a computing system, e.g., a back-end computing system separate from management software. Such management software, also referred to herein as a UI client, may provide UI elements, such as images, icons, or graphics, for representing various elements therein. However, problematic issues can arise when UI elements associated with the various elements are inconsistent and/or inaccurate. For example, a UI client may provide a generic icon to represent all elements or may provide an icon depicting an 'A' type element for representing a 'B' type element. Further issues can arise when different UI clients provide different and/or conflicting UI elements for the same set of elements. Hence, providing conflicting, confusing, and/or inaccurate UI elements may result in user confusion and/or user apathy (e.g., UI elements may be ignored by a user), thereby negating benefits involved in providing UI elements for representing various elements.

SUMMARY

Methods, systems, and computer readable mediums for providing user interface (UI) information associated with a computing system are disclosed. According to one exemplary embodiment, a method for providing UI information comprises receiving, from a requesting entity, a request for information associated with an element of a computing system, selecting, using data from the request, a UI element for representing the element from a repository comprising a set of UI elements for representing various elements of the computing system, and providing, to the requesting entity, UI information for displaying the UI element.

BRIEF DESCRIPTION OF THE DRAWINGS

The subject matter described herein will now be explained with reference to the accompanying drawings of which:

FIG. 2 is a diagram illustrating an exemplary user interface (UI) information format according to an embodiment of the subject matter described herein;

DETAILED DESCRIPTION

Figure 1:
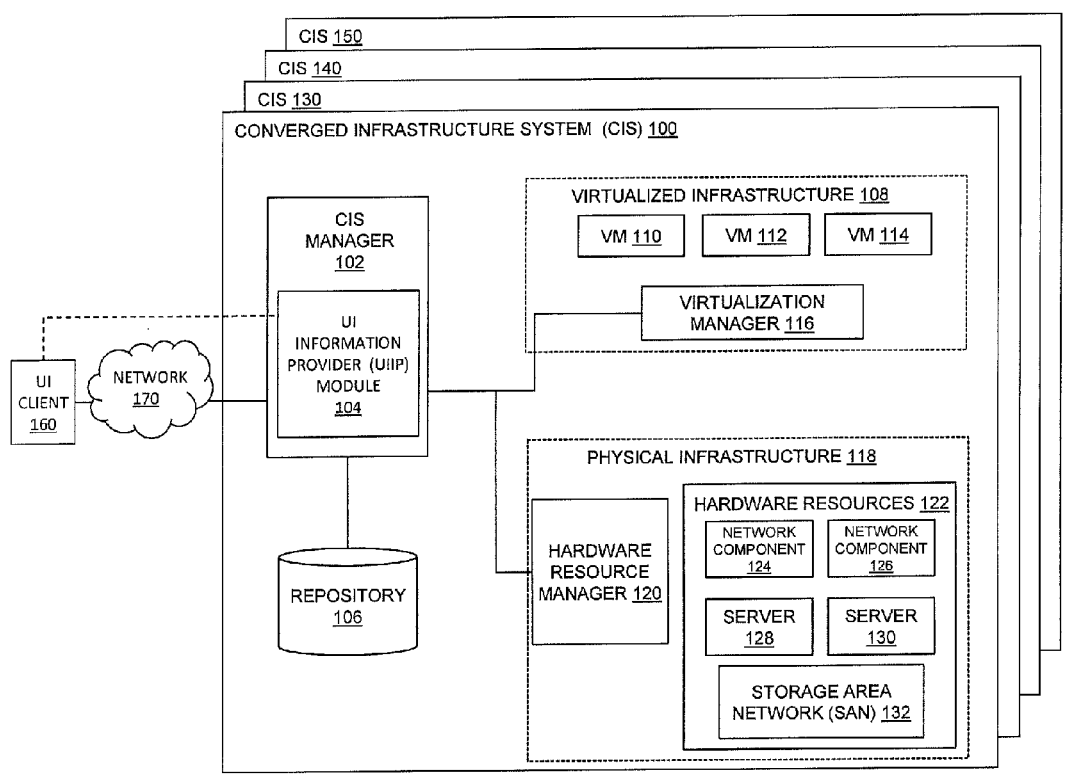
FIG. 1 is a diagram illustrating an exemplary converged infrastructure system according to an embodiment of the subject matter described herein.

The subject matter described herein includes methods, systems, and computer readable mediums for providing user interface (UI) information associated with a computing system. For example, an exemplary computing system may include one or more computing platforms comprising one or more computing system elements (CSEs), such as computing elements, software elements, networking elements, switching elements, storage elements, hardware elements, and/or firmware elements. In some embodiments, an exemplary computing system may include a converged infrastructure system (CIS), such as, for example, a Vblock™ System from VCE Company, LLC. A CIS can comprise multiple CSEs (e.g., components, physical resources and/or virtual resources) in a preconfigured or prepackaged computing platform, where some CSEs are developed and/or manufactured by multiple entities. For example, an exemplary CIS can comprise data storage devices, servers, networking equipment, and software for managing physical resources and/or virtualized resources (e.g., virtual servers).

When displaying management or performance information relating to a particular element in a computing system, a user interface (UI) client (e.g., software for managing or monitoring a computing system or one or more CSEs therein) may present a UI element associated with that element. For example, a UI client may display an image intended to represent a switch if the information being displayed is related to switch operations. In another example, a UI client may display an image intended to represent a complete computing system if the information being displayed is related to system operations. Conventionally, each UI client may independently develop UI elements for representing elements of a computing system and incorporate those UI elements as part of a resource bundle for use by the UI client. As such, UI elements for CSEs can vary among different UI clients and may even include generic UI elements to reduce development costs. Further, since these UI elements are part of the UI client, the UI elements may only be updated when the UI client is updated, which can result in the presentation of UI elements that are out of date. Moreover, if there is inconsistency with respect to the representation across UI clients, users of such UI clients gain little value from the UI elements. This lack of consistency can be accentuated when the UI elements are displayed or decorated in some fashion with a color coding or badge to indicate state related information, e.g., current load or utilization.

In accordance with some aspects of the disclosed subject matter, user interface information, such as a UI element (e.g., a visual element, a tactile element, an aural element, and/or a multimedia element) and/or information for retrieving, identifying, naming, or locating a UI element (e.g., metadata, a uniform resource identifier (URI), a uniform resource name (URN), and/or a uniform resource locator (URL)), may be provided to UI clients from a reliable or known source. For example, multiple UI clients may request information about a CSE from a computing system or software therein. In this example, the computing system or software therein may include or have access to a repository (e.g., a system library) of UI elements for representing the CSEs. In this example, the computing system or software therein may provide UI information to each UI client and each UI client may use this information to present a relevant and consistent UI element for representing the CSE. By providing and utilizing consistent UI information, users can quickly identify an element (e.g., a CSE) and, optionally, state related information, irrespective of the UI client being used. Moreover, UI consistency and/or uniformity can improve user experience, increase productivity, and reduce user errors.

In accordance with some aspects of the disclosed subject matter, UI information may be provided from a centralized and/or single source. For example, a CIS manufacturer may be responsible for developing UI elements associated with CSEs and may provide the UI elements and/or related information to requesting entities. In another example, a computing system may be capable of obtaining, gathering, or developing UI elements associated with various elements of the computing system and may provide the UI elements and/or related information to requesting entities. By providing UI information from a centralized and/or single source, up-to-date and consistent UI elements may be provided to UI clients, thereby allowing the UI clients to utilize up-to-date and consistent UI elements without having to update the UI clients. For example, if a centralized and/or single source (e.g., a CIS manufacturer) adds a UI element for a new model of a network switch, clients will receive the UI element for the network switch even if the client has not been updated. Moreover, time and other development resources may be conserved since the UI clients need not develop their own UI elements for representing CSEs.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a block diagram illustrating exemplary CIS 100, CIS 130, CIS 140, and CIS 150 according to an embodiment of the subject matter described herein. Each of CIS 100, CIS 130, CIS 140, and CIS 150 can comprise CSEs, such as virtual resources and physical resources. Exemplary physical resources can comprise a processor, a server, network equipment, a router, a switch, wiring or cabling, a storage device, a physical port, and/or a communications interface. Exemplary virtual resources can comprise a virtual entity (e.g., an entity that appears as a physical entity but comprises one or more elements associated with one or more CISs), a virtual machine, a virtual server, a virtual storage device, a virtual port, and/or a virtual communications interface. Each of CIS 100, CIS 130, CIS 140, and CIS 150 may also comprise software and related elements for managing the CIS and/or portions therein.

In some embodiments, each of CIS 100, CIS 130, CIS 140, and CIS 150 may be configured to provide data center functionality, cloud service functionality, and/or other functionality. In some embodiments, each of CIS 100, CIS 130, CIS 140, and CIS 150 can comprise similar CSEs and may be located at one or more physical locations or sites. Each of CIS 100, CIS 130, CIS 140, and CIS 150 may be capable of communicating with each other and may communicate with various other entities, such as network nodes (e.g., servers hosting online sites) and users. For example, UI client 160 may represent any entity (e.g., software executing on a processor) for allowing a user (e.g., a human system administrator or an automated system) to interact with or receive information (e.g., UI information) associated with CIS 100, CIS 130, CIS 140, CIS 150, CSEs therein, and/or other entities. In some embodiments, UI client 160 may establish a communication directly to CIS 100 without using network 170.

In some embodiments, CIS 100 can comprise a CIS manager 102 (e.g., a CIS management module), a repository 106, virtualized infrastructure 108, and/or physical infrastructure 118. CIS manager 102 may be any suitable entity for managing aspects of CIS 100. CIS manager 102 may be configured to communicate with various CSEs for managing various CSEs. For example, CIS manager 102 can be configured to access each CSE within CIS 100 and return relevant information to UI client 160. For example, CIS manager 102 may be configured to manage performance, resource utilization levels, and other aspects associated with virtualized infrastructure 108 and/or physical infrastructure 118. In some embodiments, CIS manager 102 comprises VCE Vision™ Intelligent Operations software and/or firmware. In some embodiments, CIS manager 102 may have access to UI information associated with CIS 100, CIS 130, CIS 140, CIS 150, and/or one or more CSEs.

CIS manager 102 can comprise or interact with a UI information provider (UIIP) module 104. UIIP module 104 can be any suitable entity (e.g., software executing on a processor) for providing UI information (e.g., UI elements and/or URIs for identifying one or more UI elements) associated with a CIS or one or more CSEs therein. In some embodiments, UIIP module 104 can include one or more communications interfaces for communicating with various entities, such as UI client 160, CIS 100, CIS 130, CIS 140, CIS 150, and/or one or more CSEs. Exemplary communications interfaces may receive or send messages associated with various protocols or formats.

In some embodiments, UIIP module 104 can be configured to receive requests for UI information and/or may provide UI information via an application programming interface (API) or other interface. For example, UI client 160 may request, using a representation state transfer (REST) API related message, information about a particular CIS or CSE therein. In this example, UIIP module 104 may provide, using a REST API related message, UI information associated with the particular CIS or CSE therein.

In some embodiments, UIIP module 104 can include functionality for configuring UI information, e.g., by obtaining, modifying, and/or generating UI information, such as UI elements. For example, UIIP module 104 may obtain UI information by retrieving UI elements from repository 106 or memory. In another example, UIIP module 104 may obtain state information associated with a CSE and may generate a UI element based on the state information. In yet another example, UIIP module 104 may combine or integrated two or more UI elements into a single UI element.

In some embodiments, UIIP module 104 can be configured to provide UI information using URIs (e.g., URLs or URNs) stored in extensible markup language (XML) payloads. For example, UIIP module 104 can provide one or more URIs for identifying and/or retrieving one or more UI elements. In this example, each URI may identify a visual element having certain characteristics, including one or more user-defined characteristics or UI element configuration data, such as dimensions (e.g., a display size or a print size), a resolution, and/or a data format (e.g., a portable network graphics (PNG) format, a joint photographic expert group (JPEG) format, an encapsulated postscript (EPS) format, a graphics interchange format (GIF) format, and/or a scalable vector graphics (SVG) format).

In some embodiments, UIIP module 104 can include functionality for storing and providing UI information (e.g., UI elements) at a web server, at a database (e.g., repository 106), or at any suitable entity accessible by UI client 160. For example, UIIP module 104 may be configured to trigger a web server or another entity to provide UI information via an identifier, e.g., a URI, a URL, or URN, provided by UIIP module 104 to UI client 160. In this example, UI client 160 may use the provided identifier to download or retrieve the UI information.

In some embodiments, UIIP module 104 can include functionality for configuring one or more UI elements. For example, in response to receiving a request for CSE and/or UI information, UIIP module 104 can be configured to retrieve an image or other information from a software resource library, also referred to as a system library, at repository 106 (e.g., a data storage device or memory). In this example, repository 106 may include an image or other UI element representing every CSE, along with various decorations, badges, or backgrounds usable for indicating operation status, state information, or other information associated with a CSE. Using the retrieved information, UIIP module 104 may configure a UI element prior to providing the UI element or related UI information to a requesting entity, such as UI client 160 or any suitable entity for requesting or receiving UI information.

In some embodiments, UIIP module 104 can be configured to modify a UI element or portions thereof. For example, after retrieving a UI element (e.g., an image or icon) from repository 106, UIIP module 104 may modify the UI element to include additional information or may modify certain characteristics associated with the UI element. For example, if UI client 160 requests a UI element (e.g., an aural element or sound) with certain dimensions or quality, UIIP module 104 may resize dimensions associated with the UI element or resample the UI element. In another example, if UI client 160 requests a UI element (e.g., a visual element or image) in a PNG format, UIIP module 104 may convert the UI element from a first format to the PNG format. In yet another example, if UI client 160 requests a UI element (e.g., a multimedia element or video) in an audio video interleaved (AVI) format, UIIP module 104 may convert the UI element from a first format to the AVI format. In yet another example, UIIP module 104 may modify and/or convert a UI element or portions thereof based on default or preconfigured information, dynamically determined information (e.g., current request load on UIIP module 104), and/or other information. In this example, UIIP module 104 may modify and/or convert a UI element or portions thereof based on information from one or more sources, e.g., sources that may be different from UI client 160 and/or UIIP module 104.

In some embodiments, UIIP module 104 can be configured to generate a UI element or portions thereof. For example, UIIP module 104 may gather state information related to a CIS or CSE therein and may use this information in generating a UI element, e.g., an image, a decoration, a badge, a background, or a symbol. In this example, the generated UI element can indicate a certain state or operational status and can be integrated or incorporated with one or more other UI elements. For example, where a UI element includes a first image of network component 124, UIIP module 104 may modify the first image to include a decoration depicting a number of lines or legs protruding from network component 124. In this example, each leg can represent an active port, where the number of legs depicted may vary depending on the number of active ports at the time the UI element is generated. In another example, where a UI element includes a first image of server 128, UIIP module 104 may modify the first image to include a badge (e.g., as a semi-transparent overlay) indicating a number of active virtual machines executing on server 128. In yet another example, where a UI element includes a first image of server 128, UIIP module 104 may modify the first image to include a background image (e.g., as a graph or chart) indicating a processor load during the preceding five minutes. In yet another example, where a UI element includes a first image of storage area network 132, UIIP module 104 may modify the first image to include a background image (e.g., as a graph or chart) indicating the Input/Output Operations Per Second (IOPs) associated with storage area network 132 during the preceding five minutes.

In some embodiments, UIIP module 104 can access or store UI elements (e.g., modified or generated UI elements) in repository 106. Repository 106 can include any data storage unit (e.g., a database or plurality of databases) that may be configured to store UI information, such as UI elements and related URIs, URLs, and/or URNs. In some embodiments, UI elements may include images, icons, graphics, visual elements, tactile elements, and/or aural elements. For example, repository 106 may include one or more sounds, videos, vibration patterns, and/or images usable for representing various CSEs or state information about CSEs. Although FIG. 1 depicts repository 106 as a local data storage unit residing on CIS 100, repository 106 can also be embodied as a data storage unit located at an online location (e.g., a public distributed content site), on a local proxy server in a customer's or system administrator's environment, or on a different CIS without departing from the scope of the disclosed subject matter. Further, repository 106 may be implemented using one or more computing platforms, devices, or systems.

In some embodiments, repository 106 can be provisioned with UI information from a second repository (e.g., from CIS 130 or from an online location, such as a known, online site that may be hosted by the CIS manufacturer). For example, UI information may be obtained or copied from a second repository (e.g., a second CIS, an online site, online repository, or any other online location) over network 170, using secure copy (SCP) protocol, file transfer protocol (FTP), secure file transfer protocol (SFTP), hypertext transfer protocol (HTTP), or any like protocol. In some embodiments, CIS 100 and a second CIS (e.g., CIS 130) may be located at a common site and can be communicatively connected by a wired connection. In such a configuration, repository 106 may be provisioned with UI information from the second CIS via the wired connection. It is understood that the provisioning of repository 106 with UI information with the exemplary methods described above may be conducted via any automated or automatic manner. In addition, UI information copied from a second repository and installed into repository 106 may utilize any form of transportable mediums, such as a compact disc (CD), flash memory, a universal serial bus (USB) device, and the like.

Virtualized infrastructure 108 can comprise a virtualization environment configured to simulate elements of a computing device, e.g., a processor, system memory, and a storage device, for executing one or more virtual machines (VMs) (e.g., VM 110, VM 112, and VM 114). Each of VM 110, VM 112, and VM 114 may be configured to perform various functions and/or services, such as web server functions or cloud application services, and may interact with various nodes, elements, and/or users.

In some embodiments, virtualized infrastructure 108 can be associated with one or more virtual entities. Each virtual entity can comprise one or more CIS or portions therein, e.g., resources from one or more CISs. In some embodiments, virtualization manager 116 may allow logical entities to be created, deleted, or modified using an API and/or a graphical user interface (GUI). Virtualization manager 116 may be any suitable entity (e.g., software executing in a virtual machine) for managing aspects associated with virtualized infrastructure 108. In some embodiments, virtualization manager 116 may be configured to provide data center management through one or more communications interfaces. For example, virtualization manager 116 may communicate with one or more third-party management tools using APIs.

Physical infrastructure 118 can comprise hardware resources 122, such as network components 124-126, servers 128-130 (sometimes referred to as "hosts"), and at least one storage area network (SAN) 132. Hardware resources 122 may be communicatively connected to various other CSEs in CIS 100 and other entities. Hardware resources 122 can be configured to be used by one or more virtual entities. In some embodiments, network components 124-126 (e.g., network switches) may be configured to enable communication between the components in CIS 100. For example, server 128 and SAN 128 may be used in implementing VM 110 and VM 112 and server 130 and SAN 132 may be used in implementing VM 114 and virtualization manager 116. In some embodiments, one or more file share storage (FSS) systems (not shown) can be utilized to provide file system level access to a CIS across a local area network (LAN).

Hardware resource manager 120 can be any suitable entity (e.g., software executed in a virtual machine) for managing aspects associated with physical infrastructure 118. In some embodiments, hardware resource manager 120 may be configured to provision hardware resources 122 via one or more communications interfaces. For example, hardware resource manager 120 may provision hardware resources 122 for implementing one or more virtual entities in virtualized infrastructure 108. In some embodiments, hardware resource manager 120 may comprise any management element or entity, such as a unified infrastructure manager (UIM) or a unified computing system (UCS) director entity, which is configured to provision the physical hardware of CIS 100.

It will be appreciated that FIG. 1 is for illustrative purposes and that various elements, their locations, and/or their functions as described above in relation to FIG. 1 may be changed, altered, added, or removed.

FIG. 2 is a diagram illustrating an exemplary UI information format according to an embodiment of the subject matter described herein. In some embodiments, UI information may be provided via an API related message, such as a hypertext transfer protocol (HTTP) POST message. In some embodiments, UI information may be contained in an XML payload. For example, UIIP module 104 can be configured to provide UI information associated with a CSE in the form of a XML payload.

Referring to FIG. 2, an exemplary XML payload 200 can include non-UI information 202 (e.g., a resource identifier, a location identifier, a serial number, resource type information, performance metrics, a load factor, a temperature, and/or health information) and UI information 204. In some embodiments, non-UI information 202 and UI information 204 can be indicated using one or more XML elements (e.g., an XML tag—value pair). For example, each XML element may include a descriptive tag (e.g., <alias> </alias>) and a value or information located within the descriptive tag (e.g., "CIS A-320").

Some exemplary XML elements for providing non-UI information 202 can include an "<alias>" XML element for indicating a known alias or nickname associated with a CSE, a "<dbid>" XML element for indicating a database identifier associated with a CSE, a "<description>" XML element for indicating a description associated with a CSE, a "<moid>" XML element for indicating a module identifier associated with a CSE, a "<name>" XML element, a "<url>" XML element for indicating a URL associated with a CSE, a "<assetid>" XML element for indicating an asset identifier associated with a CSE, a "<calculatedStatus>" XML element for indicating operation status or state information associated with a CSE, and/or a "<firmRev>" XML element for indicating a firmware revision number associated with a CSE.

In some embodiments, an XML element for providing UI information 204 may include a descriptive tag (e.g., <image> </image>) and information (e.g., a URI) for identifying or retrieving a certain UI element. Some exemplary XML elements for providing UI information 204 can include an "<image>" XML element for indicating an identifier for retrieving an image associated with a CSE, an "<imagewithdecoration>" XML element for indicating an identifier for retrieving a decorated image associated with a CSE, and/or an "<imagewithbackground>" XML element for indicating an identifier for retrieving an image with a background associated with a CSE.

In some embodiments, an "<image>" XML element may include a URI, URL, or URN usable for retrieving an image that represents a certain CIS or CSE therein. For example, the image associated with an "<image>" XML element may be a "base" image depicting a particular CSE with a white or transparent background. As used herein, a "base" image may include any visual element usable for adding, integrating or incorporating one or more additional visual elements, such as images, decorations, and/or backgrounds.

In some embodiments, an "<imagewithdecoration>" XML element may include a URI, URL, or URN for retrieving an image that represents a certain CIS or CSE therein. For example, the image associated with an "<imagewithdecoration>" XML element may be a "base" image depicting a particular CSE with one or more decorations, such as an image, a badge, a symbol, or a UI element. The decoration may be indicative of information associated with the represented CSE. For example, when operational status information is requested for CIS 100, a first image representing CIS 100 may be modified to include a "✓" decoration or an "X" decoration, where the "✓" decoration may indicate that CIS 100 is currently operating at normal levels while the "X" decoration may indicate that CIS 100 is experiencing problems.

In some embodiments, an "<imagewithbackground>" XML element may include a URI, URL, or URN usable for retrieving an image that represents a certain CIS or CSE therein. For example, the image associated with an "<imagewithbackground>" XML element may be a "base" image depicting a particular CSE with an added background, e.g., a colored, stylized, patterned, or unique background different from the background of the "base" image. The added background may be indicative of information associated with the represented CSE. For example, when operational status information is requested for CIS 100, a first image representing CIS 100 may be modified to include a green background or a red background, where the green background indicates that CIS 100 is currently operating at normal levels while the red background indicates that CIS 100 is experiencing problems. In another example, a background may include charts, graphs, or other visual elements associated with state or operation information associated with the represented CSE.

In some embodiments, XML payload 200 may include additional XML element tags for providing one or more UI elements. For example, where UI client 160 requests various attributes of a UI element to modified or generated, additional element tags may be generated and used such that UI client 160 is capable of obtaining and using the UI elements.

In some embodiments, an XML element tag may be labeled with a special identifier for indicating (e.g., to UI client 160) a certain UI element. For example, if UI client 160 requests a UI element in a GIF format, a related XML element may be labeled as "<imageasGIF>" or as "<GIFimage>". In another example, if UI client 160 requests a UI element having a resolution of a 600 DPI, a related XML element may be labeled as "<image600dpi>".

In some embodiments, XML payload 200 may include certain UI elements as separate XML elements. For example, XML payload 200 may include a first XML element "<decoration1>" that identifies a semi-transparent image containing a single decoration and a second XML element "<image>" that identifies a "base" image. In this example, UI client 160 may perform overlaying or integration of the decoration and the "base" image.

In some embodiments, the requesting entity may request special UI elements (for example with decorations, badges, in particular formats or size) by adding those requests to the end of a base URI or URL, rather than using the approach described in UI Information 204. For example, the requesting entity may request a UI element using a URI, e.g., https://<url-to-image>?size=dimensions,format=jpeg, background=processor-load or https://<url-to-image>?size=dimensions,format=gif, background=processor-load,decoration=stoplight-operationstatus. In this example, UIIP module 104 or another module can be configured to parse and/or use information in the URI for configuring and providing the requested UI element to the requesting entity.

While XML payload 200 depicts an exemplary format for providing UI information 204, it will be appreciated that FIG. 2 is for illustrative purposes and that UI information 204 can be provided (e.g., to UI client 160) using any viable format, protocol, and/or medium. Further, while FIG. 2 depicts UI information 204 associated with images, it will be appreciated that UI information 204 may include information associated with various UI elements. Furthermore, it will be appreciated that UI information 204 can be provided for numerous CISs and/or CSEs, such as network switches, compute chassis, compute blades, storage arrays, disk array expansion (DAE) trays, drives, etc.

Figure 3:
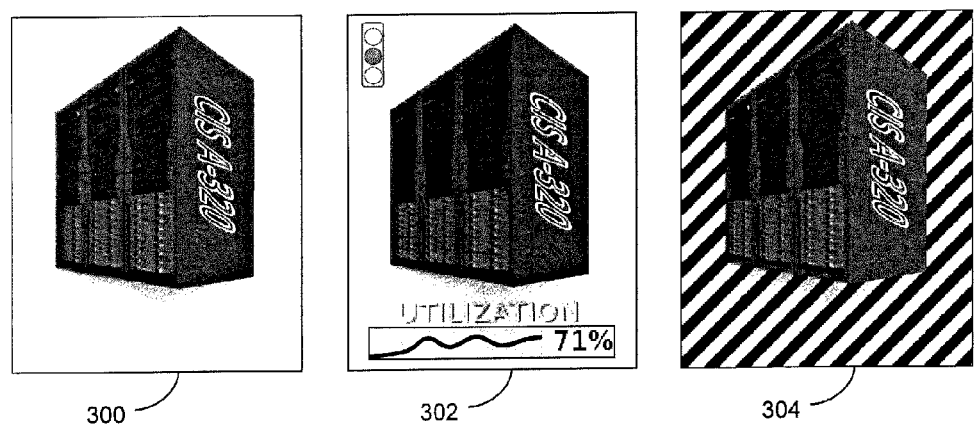
FIG. 3 is a diagram illustrating exemplary UI elements according to an embodiment of the subject matter described herein.

FIG. 3 is a diagram illustrating exemplary UI elements 300, 302, and 304 according to an embodiment of the subject matter described herein. Referring to FIG. 3, exemplary UI element 300 depicts a particular CIS "CIS A-320", exemplary UI element 302 depicts the same CIS along with one or more decorations (e.g., overlayed graphics), and exemplary UI element 304 depicts the CIS along with a patterned background (e.g., a yellow and black diagonal "warning" pattern).

In some embodiments, UI element 300 can include a transparent, a semi-transparent, or a white background. For example, UI element 300 may be retrieved using a URI located within a "<image> </image>" XML tag in XML payload 200. In this example, UI element 300 may be consider a "base" image usable for adding additional UI elements to represent current or historical state information about a represented CIS.

In some embodiments, UI element 302 can include one or more decorations in addition to a "base" image of a CIS. For example, UI element 302 may be retrieved using a URI located within a "<imagewithdecoration> </imagewithdecoration>" XML tag in XML payload 200. In this example, UI element 302 can include a stoplight graphic where a lighted circle indicates a particular status (e.g., green can indicate "normal" activity, yellow can indicate "congested" activity, and red can indicate "problematic" activity). UI element 302 can also include one or more decorations indicating utilization or load. For example, UI element 302 may include a power meter graphic that depicts a utilization percentage value (e.g., 71% utilization) associated with the CIS. The power meter graphic may also include a line graph that illustrates the utilization level(s) of the CIS over a period of time.

In some embodiments, UI element 304 can include a colored, stylized, patterned, or unique background in addition to a "base" image of a CIS. For example, UI element 302 may be retrieved using a URI located within a "<imagewithbackground> </imagewithbackground>" XML tag in XML payload 200. In this example, UI element 302 can include different colors or patterns to indicate operational status (e.g., a green or white background can indicate "normal" activity, a yellow background can indicate "congested" activity, and a yellow and black diagonal "warning" pattern background can indicate "problematic" activity.

In some embodiments, UI elements 300, 302, and/or 304 can be animated or includes video, sound, or other UI elements. For example, UI element 302 may be retrieved using a URI located within a "<imageasGIF> </imageasGIF>" XML tag in XML payload 200. In this example, UI element 302 can include animations to indicate and/or emphasis certain state information associated with a CSE, such as a flashing exclamation point indicating congestion, a stoplight graphic with a flashing red light indicating connectivity or processing problems, or a graphic that shows a loop of load activity for a certain period of time as a moving line graph.

It will be appreciated that FIG. 3 is for illustrative purposes and that UI elements can be associated with various UI types and/or formats, such as visual, aural, tactile, and multimedia elements. Further, it will be appreciate that various information (e.g., resource utilization, load, operational status, location, etc.) associated with a CIS or CSE may be represented using a UI element and such information may be expressed in various ways, such as using various integration techniques (e.g., overlays, filters, morphing, splicing, blending, etc.) and/or presentation techniques (e.g., charts, graphs, sounds, vibrations, videos, etc.).

Figure 4:
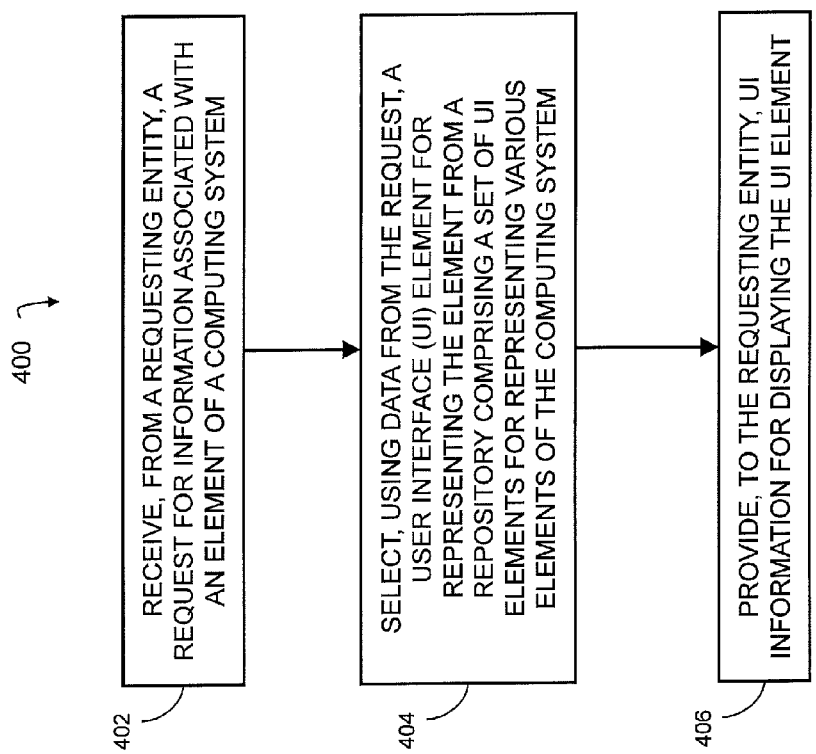
FIG. 4 is a diagram illustrating an exemplary method for providing UI information according to an embodiment of the subject matter described herein.

FIG. 4 is a diagram illustrating an exemplary method 400 for providing UI information according to an embodiment of the subject matter described herein. In some embodiments, exemplary steps 402, 404, and/or 406 associated with exemplary method 400 may be performed by CIS 100, CIS manager 102, UIIP module 104, and/or another node or module. For illustrative purposes and explanation, references to elements included in FIGS. 1, 2, and 3 may be used below.

At step 402, a request for information associated with an element of a computing system is received from a requesting entity. For example, UI client 160 may send, to UIIP module 104, a request for information about the operational status of CIS 100 using an API related message. In this example, the request may be an API related message, such as an HTTP GET message. In this example, the request may also include information about receiving UI information associated with CIS 100 or a CSE therein.

In some embodiments, prior to receiving the request, the repository may be populated with the set of UI elements. For example, an operator (e.g., CIS administrator) may populate repository 106 when installing or updating various software associated with providing UI information. In another example, UIIP module 104 or another entity may be configured to automatically retrieve a set of UI elements in response to receiving a notification indicating new UI elements are available for download. In this example, UIIP module 104 or another entity may download and store the retrieved UI elements in repository 106.

In some embodiments, the computing system includes at least one member selected from a group consisting of a converged infrastructure system (CIS), a computing platform, a computing device, multiple computing platforms, multiple computing devices, a backend computing system, a network-connected computing system, a computing system comprising elements from various manufacturers.

In some embodiments, UI client 160 can send a message for requesting a UI element or related UI information (e.g., a URI) be provided in a particular format and/or include certain characteristics or attributes. For example, UI client 160 can include UI element configuration data in a request to UIIP module 104. In this example, the UI element configuration data may indicate that a UI element include or incorporate a visual graph of resource utilization of CIS 100 for a preceding five minutes. In another example, UI client 160 can request that UI information includes PNG images at a resolution of 300 dots per inch (DPI). In yet another example, UI client 160 can request that UI information be sent periodically, aperiodically (e.g., dynamically), or in response to a certain event, such as a workload indicator for a CSE crossing a predefined threshold.

In some embodiments, UIIP module 104 may select and modify a UI element or related UI information (e.g., a URI) to include in a particular format and/or include certain characteristics or attributes. For example, UI client 160 can request information identifies a UI element representing a storage device of a computing system. In this example, UIIP module 104 may automatically determine an appropriate format, dimensions to convert a UI element and/or may modify the UI element to include certain characteristics or state related information, e.g., based on preconfigured information or historical information and/or without provided UI element configuration data.

At step 404, a UI element for representing the element is selected, using data from the request, from a repository comprising a set of UI elements for representing various elements of the computing system (e.g., CSEs). For example, a request message may include UI element configuration data (e.g., a format, a resolution, and/or display dimensions) indicating characteristics associated with a UI element that are requested or preferred by the requesting entity. In this example, UIIP module 104 may use the data in the request to determine, identify, obtain, and/or modify a UI element from a group of UI elements stored in repository 106 and/or to generate UI elements.

In some embodiments, selecting a UI element includes configuring a UI element. For example, in response to gathering state information about a CSE, UIIP module 104 may configure a UI element by modifying the UI element to incorporate the state information (e.g., as a semi-transparent image or graphic) into the UI element. In another example, in response to gathering state information about a CSE, UIIP module 104 may modify a UI element to change a background color or add a graphic overlay thereby indicating a particular operational status of the CSE.

In some embodiments, selecting a UI element includes generating the UI element, resizing the UI element, modifying the UI element, modifying characteristics associated with the UI element, modifying a format of the UI element, modifying a resolution of the UI element, modifying the UI element to include information associated with the CSE, modifying the UI element to include state information associated with the CSE, modifying the UI element to include operation status associated with the CSE, and/or modifying the UI element to include statistical information associated with the CSE.

At step 406, UI information for displaying the UI element is provided to the requesting entity. For example, UIIP module 104 may provide UI information using HTTP or SFTP or some other mechanism for transmitting the UI information. In this example, the UI information may provide a UI element or information for retrieving a UI element.

In some embodiments, UI information for displaying a UI element is updated and the updated information is provided. For example, UI client 160 may request dynamic information (e.g., current resource utilization) associated with a CSE be provided periodically, aperiodically (e.g., dynamically), or in response to a certain event. In this example, UIIP module 104 may gather or receive such information about a CSE and may update and provide related UI information periodically or aperiodically (e.g., dynamically) to UI client 160. In some embodiments, dynamic or updated information may be provided until a requesting entity indicates it no longer wants to be updated or after a certain time period has elapsed.

In some embodiments, providing UI information for displaying a UI element includes using an API related message (e.g., a REST API related message). Exemplary API related messages can include HTTP messages, FTP messages, SFTP messages, XML related messages, and/or other messages. For example, a REST API related message can include URIs that indicate or identify UI elements or other UI information.

In some embodiments, UI information includes a UI element, metadata (e.g., dimensions, resolution, time to live, or format information) associated with a UI element, a URI associated with a UI element, a URL associated with a UI element, a URN associated with a UI element, and information for identifying a UI element associated with the CIS element. For example, UIIP module 104 can provide a URI such that UI client 160 can retrieve a UI element. In another example, UIIP module 104 can provide a UI element (e.g., an image) directly, e.g., as data in a message payload.

In some embodiments, a UI element includes an image, an icon, a graphic, a visual element, a tactile element, an aural element, and/or a multimedia element. For example, a UI element can include an image representing a network switch. In another example, a UI element can include an aural element (e.g., a sound) or tactile element (e.g., a vibration pattern) that represents a CSE or information about a CSE.

Figure 5:
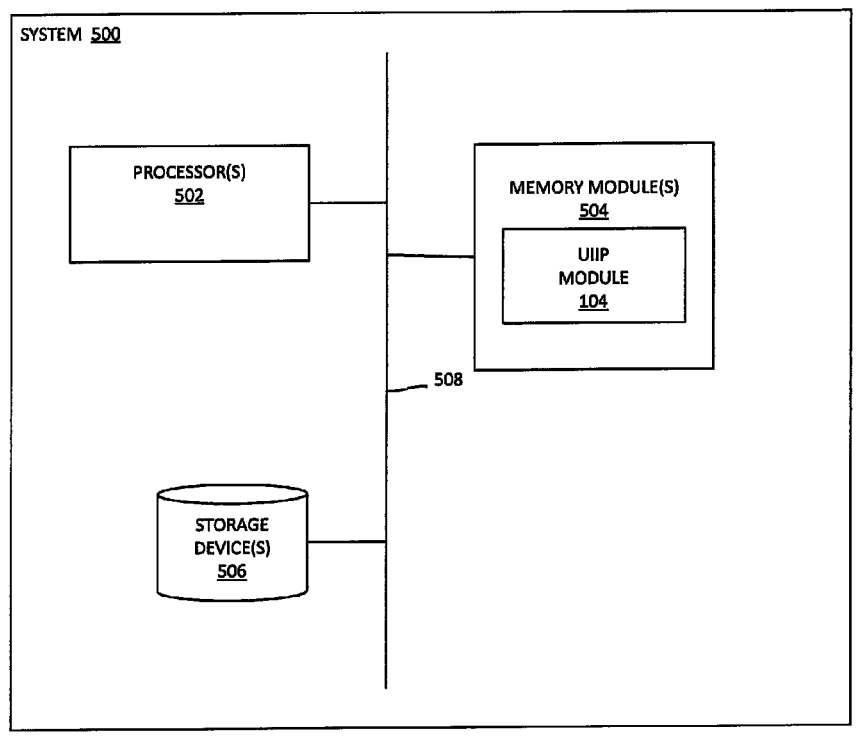
FIG. 5 is a diagram illustrating an exemplary general purpose computer system suitable for use in performing functions described herein.

FIG. 5 is a diagram illustrating an exemplary general purpose computer system suitable for use in performing functions described herein. As depicted in FIG. 5, system 500 includes one or more processors 502, one or more memory modules 504, and one or more storage device 506 communicatively connected via a system bus 508. In some embodiments, processors 502 can include a microprocessor, central processing unit (CPU), or any other like hardware based processing unit. In some embodiments, UIIP module 104 can be stored in one or more memory modules 504, which can include random access memory (RAM), read only memory (ROM), optical read/write memory, cache memory, magnetic read/write memory, flash memory, or any other non-transitory computer readable medium. In some embodiments, one or more processors 502 and one or more memory modules 504 can be used to execute, implement, and/or manage the operation of UIIP module 104. In some embodiments, one or more storage devices 506 can include any storage medium or storage unit that is configured to store data accessible by one or more processors 502 via system bus 508. Exemplary storage devices can include one or more local databases hosted by system 500. In some embodiments, repository 106 or portions thereof may be stored in one or more storage devices 506 and/or in one or more memory modules 504.

As indicated above, the subject matter disclosed herein can be implemented in software in combination with hardware and/or firmware. For example, the subject matter described herein can be implemented in software executed by a processor. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms. For example, UIIP module 104 and/or repository 106 (e.g., a system library or data therein) may be located at a single computing system or may be distributed across one or more devices, platforms, and/or systems. As used in the present disclosure, the terms "function" or "module" refer to hardware, firmware, or software in combination with hardware and/or firmware for implementing features described herein.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing user interface (UI) information, the method comprising:
   receiving, from a requesting entity, a request for information associated with a computing system element of a computing system, wherein the computing system element includes at least one member selected from a group consisting of a hardware element or a virtual machine;
   selecting, using data from the request, a user interface (UI) element for representing the computing system element from a repository comprising a set of UI elements for representing various elements of the computing system, wherein selecting the UI element includes modifying the UI element to include state information associated with the computing system element of the computing system; and
   providing, to the requesting entity, UI information for displaying the UI element, wherein providing the UI information includes providing a uniform resource identifier (URI) for downloading the UI element in an extensible markup language (XML) payload, wherein the XML payload includes at least one tag indicating at least one URI for downloading at least one variant of the UI element.

2. The method of claim 1 comprising:
   prior to receiving the request, populating the repository with the set of UI elements.

3. The method of claim 1 wherein selecting the UI element includes at least one action selected from a group consisting of obtaining the UI element, generating the UI element, resizing the UI element, modifying characteristics associated with the UI element, modifying a format of the UI element, modifying a resolution of the UI element, modifying the UI element to include an operation status associated with the computing system element of the computing system, and modifying the UI element to include statistical information associated with the computing system element of the computing system.

4. The method of claim 1 wherein providing the UI information includes providing the UI information via at least one member selected from a group consisting of an application programming interface (API) related message, a representational state transfer (REST) API related message, an extensible markup language (XML) related message, a file transfer protocol (FTP) message, a secure FTP (SFTP) message, an hypertext transfer protocol (HTTP) message, and some other technique for delivering the UI element to the requesting entity.

5. The method of claim 1 wherein the UI element includes at least one member selected from a group consisting of an image, an icon, a graphic, a visual element, a tactile element, an aural element, and a multimedia element.

6. The method of claim 1 wherein the computing system includes at least one member selected from a group consisting of a converged infrastructure system (CIS), a computing platform, a computing device, multiple computing platforms, multiple computing devices, a backend computing system, a network-connected computing system, and a computing system comprising elements from various manufacturers.

7. A system for providing user interface (UI) information, the system comprising:
   at least one processor;
   memory; and
   a user interface information provider (UIIP) module utilizing the at least one processor and the memory, wherein the UIIP module is configured to receive, from a requesting entity, a request for information associated with a computing system element of a computing system, wherein the computing system element includes a hardware element or a virtual machine, to select, using information from the request, a user interface (UI) element for representing the computing system element from a repository comprising a set of UI elements for representing various elements of the computing system, wherein selecting the UI element includes modifying the UI element to include state information associated with the computing system element of the computing system, and to provide, to the requesting entity, UI information for displaying the UI element, wherein providing the UI information includes providing a uniform resource identifier (URI) for downloading the UI element in an extensible markup language (XML) payload, wherein the XML payload includes at least one tag indicating at least one URI for downloading at least one variant of the UI element.

8. The system of claim 7 wherein the UIIP module is configured to populate the repository with the set of UI elements prior to receiving the request.

9. The system of claim 7 wherein the UIIP module is configured to perform at least one action selected from a group consisting of obtaining the UI element, generating the UI element, resizing the UI element, modifying characteristics associated with the UI element, modifying a format of the UI element, modifying a resolution of the UI element, modifying the UI element to include an operation status associated with the computing system element of the computing system, and modifying the UI element to include statistical information associated with the computing system element of the computing system.

10. The system of claim 7 wherein the UIIP module is configured to provide the UI information via at least one member selected from a group consisting of an application programming interface (API) related message, a representational state transfer (REST) API related message, an extensible markup language (XML) related message, a file transfer protocol (FTP) message, a secure FTP (SFTP) message, an hypertext transfer protocol (HTTP) message, and an alternate technique for delivering the UI element to the requesting entity.

11. The system of claim 7 wherein the UI element includes at least one member selected from a group consisting of an image, an icon, a graphic, a visual element, a tactile element, an aural element, and a multimedia element.

12. The system of claim 7 wherein the computing system includes at least one member selected from a group consisting of a converged infrastructure system (CIS), a computing platform, a computing device, multiple computing platforms, multiple computing devices, a backend computing system, a network-connected computing system, and a computing system comprising elements from various manufacturers.

13. A non-transitory computer readable medium having stored thereon executable instructions that when executed by a processor of a computer control the computer to perform steps comprising:
receiving, from a requesting entity, a request for information associated with a computing system element of a computing system, wherein the computing system element includes a hardware element or a virtual machine;
selecting, using data from the request, a user interface (UI) element for representing the computing system element from a repository comprising a set of UI elements for representing various elements of the computing system, wherein selecting the UI element includes modifying the UI element to include state information associated with the computing system element of the computing system; and
providing, to the requesting entity, UI information for displaying the UI element, wherein providing the UI information includes providing a uniform resource identifier (URI) for downloading the UI element in an extensible markup language (XML) payload, wherein the XML payload includes at least one tag indicating at least one URI for downloading at least one variant of the UI element.

14. The non-transitory computer readable medium of claim 13 comprising:
prior to receiving the request, populating the repository with the set of UI elements.

15. The non-transitory computer readable medium of claim 13 wherein selecting the UI element includes at least one action selected from a group consisting of obtaining the UI element, generating the UI element, resizing the UI element, modifying characteristics associated with the UI element, modifying a format of the UI element, modifying a resolution of the UI element, modifying the UI element to include an operation status associated with the computing system element of the computing system, and modifying the UI element to include statistical information associated with the computing system element of the computing system.

16. The non-transitory computer readable medium of claim 13 wherein the UI element includes at least one member selected from a group consisting of an image, an icon, a graphic, a visual element, a tactile element, an aural element, and a multimedia element.

17. The non-transitory computer readable medium of claim 13 wherein the computing system includes at least one member selected from a group consisting of a converged infrastructure system (CIS), a computing platform, a computing device, multiple computing platforms, multiple computing devices, a backend computing system, a network-connected computing system, and a computing system comprising elements from various manufacturers.

* * * * *